(12) United States Patent
Nakamura et al.

(10) Patent No.: US 7,832,507 B2
(45) Date of Patent: Nov. 16, 2010

(54) ELECTRICAL SYSTEM, HYBRID VEHICLE AND METHOD OF CONTROLLING HYBRID VEHICLE

(75) Inventors: Makoto Nakamura, Okazaki (JP); Hichirosai Oyobe, Toyota (JP); Tetsuhiro Ishikawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 327 days.

(21) Appl. No.: 11/918,666

(22) PCT Filed: Nov. 15, 2006

(86) PCT No.: PCT/JP2006/323264

§ 371 (c)(1),
(2), (4) Date: Oct. 17, 2007

(65) Prior Publication Data

US 2008/0185197 A1   Aug. 7, 2008

(30) Foreign Application Priority Data

Nov. 24, 2005  (JP) ............................. 2005-338374

(51) Int. Cl.
    B60L 9/00   (2006.01)
(52) U.S. Cl. .................................. 180/2.1; 180/65.285
(58) Field of Classification Search .................. 180/2.1, 180/65.27, 65.275, 65.28, 65.285, 65.29, 180/65.31; 701/22; 903/930; 290/1 R, 1 A, 290/4 A, 40 R, 40 C, 51
    See application file for complete search history.

(56) References Cited

U.S. PATENT DOCUMENTS

| | | | | |
|---|---|---|---|---|
| 5,099,186 A | * | 3/1992 | Rippel et al. ................ | 318/803 |
| 5,462,439 A | * | 10/1995 | Keith .......................... | 320/109 |
| 5,696,367 A | * | 12/1997 | Keith .......................... | 235/381 |
| 6,727,676 B2 | * | 4/2004 | Ochiai ......................... | 320/104 |
| 6,945,345 B2 | * | 9/2005 | Meaney, Jr. ............. | 180/65.225 |
| 7,451,839 B2 | * | 11/2008 | Perlman ..................... | 180/2.1 |
| 7,582,979 B2 | * | 9/2009 | Oyobe et al. ................ | 290/1 R |
| 2006/0219448 A1 | * | 10/2006 | Grieve et al. ............... | 180/65.3 |

FOREIGN PATENT DOCUMENTS

| | | |
|---|---|---|
| JP | A-04-295202 | 10/1992 |
| JP | A-06-245325 | 9/1994 |
| JP | A-06-343205 | 12/1994 |
| JP | A-07-240705 | 9/1995 |
| JP | A-10-241095 | 9/1998 |
| JP | A 11-178109 | 7/1999 |
| JP | A-2000-307596 | 11/2000 |
| JP | A 2003-189411 | 7/2003 |
| JP | A-2004-096973 | 3/2004 |
| JP | A 2004-197649 | 7/2004 |

OTHER PUBLICATIONS

Office Action issued in Japanese Patent Application No. 2005-338374; mailed Aug. 10, 2010; with English-language translation.

* cited by examiner

*Primary Examiner*—J. Allen Shriver, II
*Assistant Examiner*—John D Walters
(74) *Attorney, Agent, or Firm*—Oliff & Berridge, PLC (57) ABSTRACT

During the communication with a house through an electric power line, a control device determines whether an engine is operating or not. If it is determined that the engine is operating, the control device stops the engine and a motor generator to stop the electric power generation by the motor generator using the output of the engine.

15 Claims, 5 Drawing Sheets

ELECTRICAL SYSTEM, HYBRID VEHICLE AND METHOD OF CONTROLLING HYBRID VEHICLE

TECHNICAL FIELD

The present invention relates to an electrical system, a hybrid vehicle and a method of controlling the hybrid vehicle, and particularly to an electrical system installed in a hybrid vehicle which is capable of transmitting electric power to and from an apparatus external to the vehicle, a hybrid vehicle in which such electrical system is installed, and a method of controlling the hybrid vehicle.

BACKGROUND ART

Japanese Patent Laying-Open No. 4-295202 discloses an electric vehicle which is capable of transmitting electric power to and from the external power supply. An electric motor drive and power processing apparatus disclosed in this document includes a secondary battery, inverters IA, IB, induction motors MA, MB, and a control unit. Induction motors MA and MB include Y-connected windings CA and CB, respectively. Windings CA and CB have respective neutral points NA and NB to which an input/output port is connected through an EMI filter.

Inverters IA and IB are provided corresponding to induction motors MA and MB, respectively, and connected to windings CA and CB, respectively. Inverters IA and IB are connected in parallel to the secondary battery.

In this electric motor drive and power processing apparatus, inverters IA and IB can generate regulated sinusoidal AC (Alternating Current) power across neutral points NA and NB and can output the generated AC power to the external device connected to the input/output port. In the recharge mode, the AC power is supplied from a single-phase power supply connected to the input/output port through the EMI filter to neutral points NA and NB of windings CA and CB. Inverters IA and IB converts the AC power supplied to neutral points NA and NB to a DC (Direct Current) power, and charges a DC power supply.

Furthermore, there is a known system which establishes communication between a service station or a charger placed external to an electric vehicle and a control device within the vehicle through an electric power line for charging the vehicle using an external power supply (for example, refer to Japanese Patent Laying-Open No. 7-240705 and Japanese Patent Laying-Open No. 6-245325).

Recently, great attention has been focused on a hybrid vehicle as an environmentally-friendly vehicle. In addition to the conventional engine, the hybrid vehicle uses, as a power source, an electricity storage device such as a battery and a motor which generates a driving force of the vehicle using the electric power from the electricity storage device.

If this hybrid vehicle is also capable of transmitting the electric power to and from outside the vehicle, the hybrid vehicle can be used as power supply equipment by supplying electric power from the vehicle to a load external to the vehicle while generating electric power using the engine, and the electric power generation with the engine can be suppressed by charging the battery from an external power supply.

If the hybrid vehicle capable of transmitting the electric power to and from outside the vehicle can establish communication with the apparatus external to the vehicle through an electric power line for transmitting the electric power to and from outside the vehicle, various pieces of information can be exchanged between the hybrid vehicle and the apparatus external to the vehicle without additionally providing a communication cable.

During the electric power generation using the engine, however, voltage noise may occur due to the electric power generation to thereby cause distortion in the waveform of the voltage transmitted through the electric power line. If the communication is established through the electric power line while distortion occurs in the voltage waveform of the electric power line, the probability of a communication error increases, which may interfere with the normal communication.

DISCLOSURE OF THE INVENTION

The present invention is directed to solve the above-described problem. An object of the present invention is to provide an electrical system which is installed in a vehicle and prevents a communication error from occurring in the communication with an apparatus external to the vehicle through an electric power line for transmitting electric power to and from outside the vehicle.

Another object of the present invention is to provide a hybrid vehicle which prevents a communication error from occurring in the communication with an apparatus external to the vehicle through an electric power line for transmitting electric power to and from outside the vehicle, and a method of controlling the vehicle.

According to the present invention, an electrical system is installed in a vehicle. The electrical system includes an electric motor operating based on a given instruction, an electricity storage device transmitting electric power to and from the electric motor, an electric power line configured such that the electric power can be transmitted between the electricity storage device and an apparatus external to the vehicle, a communication device configured to perform communication with the apparatus external to the vehicle through the electric power line, and a control unit outputting an instruction to the electric motor to stop the electric motor when the communication with the apparatus external to the vehicle is being performed by the communication device.

In the electrical system according to the present invention, the electric power is transmitted between the electricity storage device and the apparatus external to the vehicle through the electric power line. Furthermore, the communication with the apparatus external to the vehicle is performed by the communication device through the electric power line. When the communication with the apparatus external to the vehicle is being performed by the communication device, the control unit outputs the instruction to the electric motor to stop the electric motor, and thus the electric motor is stopped during the communication with the apparatus external to the vehicle. Consequently, voltage distortion in the electric power line resulting from the operation of the electric motor is suppressed during the communication with the apparatus external to the vehicle.

Therefore, according to the electrical system of the present invention, the communication error in the communication with the apparatus external to the vehicle through the electric power line can be prevented.

Preferably, the control unit outputs the instruction to the electric motor to stop the electric motor when the communication with the apparatus external to the vehicle is being performed by the communication device and communication load with the apparatus external to the vehicle by the communication device exceeds a predetermined amount.

In this electrical system, when the communication load with the apparatus external to the vehicle by the communication device exceeds the predetermined amount, the electric motor is stopped. In other words, when the communication load is low, the probability of a communication error is low even if the voltage distortion in the electric power line occurs. Consequently, the electric motor is not, stopped. Therefore, according to this electrical system, it becomes possible to minimize the probability of the electric motor being stopped while preventing a communication error in the communication with the external apparatus through the electric power line.

Furthermore, according to the present invention, an electrical system is installed in a vehicle. The electrical system includes an electric motor operating based on a given instruction, an electricity storage device transmitting electric power to and from the electric motor, an electric power line configured such that the electric power can be transmitted between the electricity storage device and an apparatus external to the vehicle, a communication device configured to perform communication with the apparatus external to the vehicle through the electric power line, and a control unit outputting an instruction to the communication device to prohibit the communication with the apparatus external to the vehicle or to limit the amount of communication with the apparatus external to the vehicle while outputting an instruction to the electric motor to drive the electric motor.

In the electrical system according to the present invention, the electric power is transmitted between the electricity storage device and the apparatus external to the vehicle through the electric power line. Furthermore, the communication with the apparatus external to the vehicle is performed by the communication device through the electric power line. While outputting the instruction to the electric motor to drive the electric motor, the control unit outputs the instruction to the communication device to prohibit the communication with the apparatus external to the vehicle or to limit the amount of communication. Consequently, the communication with the apparatus external to the vehicle is prohibited or the amount of communication is limited while the electric motor is driven.

Therefore, according to the electrical system of the present invention, it becomes possible to prevent the communication error resulting from the communication with the apparatus external to the vehicle when voltage distortion in the electric power line occurs due to the operation of the electric motor.

Preferably, the electric motor includes a star-connected polyphase winding as a stator winding. The electric power line is connected to a neutral point of the polyphase winding. The electric power is transmitted between the electricity storage device and the apparatus external to the vehicle through the electric motor and the electric power line.

According to the present invention, a hybrid vehicle includes an internal combustion engine, a first electric motor mechanically linked to the internal combustion engine and generating electric power using an output of the internal combustion engine, an electricity storage device charged with the electric power generated by the first electric motor, a second electric motor mechanically linked to a drive shaft of the vehicle and generating a driving force of the vehicle using the electric power from the electricity storage device, an electric power line configured such that the electric power can be transmitted between the electricity storage device and an apparatus external to the vehicle, a communication device configured to perform communication with the apparatus external to the vehicle through the electric power line, and a control unit outputting an instruction to the internal combustion engine to prohibit the operation of the internal combustion engine when the communication with the apparatus external to the vehicle is being performed by the communication device.

In the hybrid vehicle according to the present invention, the electric power is transmitted between the electricity storage device and the apparatus external to the vehicle through the electric power line. Furthermore, the communication with the apparatus external to the vehicle is performed by the communication device through the electric power line. When the communication with the apparatus external to the vehicle is being performed by the communication device, the control unit outputs the instruction to the internal combustion engine to prohibit the operation of the internal combustion engine. Thus, during the communication with the apparatus external to the vehicle, the internal combustion engine is stopped and the electric power generation by the first electric motor is stopped. Consequently, the voltage distortion in the electric power line resulting from the electric power generation by the first electric motor is suppressed during the communication with the apparatus external to the vehicle.

Therefore, according to the hybrid vehicle of the present invention, the communication error in the communication with the apparatus external to the vehicle through the electric power line can be prevented.

Preferably, the control unit outputs the instruction to the internal combustion engine to prohibit the operation of the internal combustion engine when the communication with the apparatus external to the vehicle is being performed by the communication device and communication load with the apparatus external to the vehicle by the communication device exceeds a predetermined amount.

In this hybrid vehicle, when the communication load with the apparatus external to the vehicle by the communication device exceeds the predetermined amount, the internal combustion engine is stopped. In other words, when the communication load is low, the probability of a communication error is low even if the voltage distortion in the electric power line occurs. Consequently, the electric power generation is not stopped. Therefore, according to this hybrid vehicle, it becomes possible to minimize the probability of the electric power generation being stopped while preventing a communication error in the communication with the external apparatus through the electric power line.

According to the present invention, a hybrid vehicle includes an internal combustion engine, a first electric motor mechanically linked to the internal combustion engine and generating electric power using an output of the internal combustion engine, an electricity storage device charged with the electric power generated by the first electric motor, a second electric motor mechanically linked to a drive shaft of the vehicle and generating a driving force of the vehicle using the electric power from the electricity storage device, an electric power line configured such that the electric power can be transmitted between the electricity storage device and an apparatus external to the vehicle, a communication device configured to perform communication with the apparatus external to the vehicle through the electric power line, and a control unit outputting an instruction to the communication device to prohibit the communication with the apparatus external to the vehicle or to limit the amount of communication with the apparatus external to the vehicle when the internal combustion engine is operating.

In the hybrid vehicle according to the present invention, the electric power is transmitted between the electricity storage device and the apparatus external to the vehicle through the electric power line. Furthermore, the communication with the apparatus external to the vehicle is performed by the communication device through the electric power line. When the internal combustion engine is operating, the control unit outputs the instruction to the communication device to prohibit the communication with the apparatus external to the vehicle or to limit the amount of communication. Thus, during the electric power generation by the first electric motor, the communication with the apparatus external to the vehicle is prohibited or the amount of communication is limited.

Therefore, according to the hybrid vehicle of the present invention, it becomes possible to prevent the communication error resulting from the communication with the apparatus external to the vehicle when voltage distortion in the electric power line occurs due to the electric power generation by the first electric motor.

Preferably, the first and second electric motors each include a star-connected polyphase winding as a stator winding. The electric power line is connected to a neutral point of each polyphase winding of the first and second electric motors. The electric power is transmitted between the electricity storage device and the apparatus external to the vehicle through the first and second electric motors and each electric power line corresponding thereto.

Furthermore, according to the present invention, a control method corresponds to a method of controlling a hybrid vehicle. The hybrid vehicle includes an internal combustion engine, a first electric motor mechanically linked to the internal combustion engine and generating electric power using an output of the internal combustion engine, an electricity storage device charged with the electric power generated by the first electric motor, a second electric motor mechanically linked to a drive shaft of the vehicle and generating a driving force of the vehicle using the electric power from the electricity storage device, an electric power line configured such that the electric power can be transmitted between the electricity storage device and an apparatus external to the vehicle, and a communication device configured to perform communication with the apparatus through the electric power line. The control method includes a first step of determining whether or not the communication with the apparatus is being performed by the communication device, and a second step of prohibiting the operation of the internal combustion engine if it is determined that the communication with the apparatus is being performed.

Preferably, the control method further includes a third step of determining whether or not communication load with the apparatus by the communication device exceeds a predetermined amount. The operation of the internal combustion engine is prohibited in the second step only when it is determined that the communication load exceeds the predetermined amount.

Furthermore, according to the present invention, a control method corresponds to a method of controlling a hybrid vehicle. The hybrid vehicle includes an internal combustion engine, a first electric motor mechanically linked to the internal combustion engine and generating electric power using an output of the internal combustion engine, an electricity storage device charged with the electric power generated by the first electric motor, a second electric motor mechanically linked to a drive shaft of the vehicle and generating a driving force of the vehicle using the electric power from the electricity storage device, an electric power line configured such that the electric power can be transmitted between the electricity storage device and an apparatus external to the vehicle, and a communication device configured to perform communication with the apparatus through the electric power line. The control method includes a first step of determining whether or not the internal combustion engine is operating, and a second step of prohibiting the communication with the apparatus or limiting the amount of communication with the apparatus if it is determined that the internal combustion engine is operating.

As described above, according to the present invention, the electric power generation is stopped during the communication with the apparatus external to the vehicle or when the communication load is high, or the communication with the apparatus external to the vehicle is prohibited or the amount of communication is limited during the electric power generation. Therefore, it becomes possible to prevent the communication error in the communication with the apparatus external to the vehicle through the electric power line for transmitting the electric power to and from outside the vehicle.

BEST MODES FOR CARRYING OUT THE INVENTION

The embodiments of the present invention will be hereinafter described in detail with reference to the accompanying drawings, in which the same or corresponding components are designated by the same reference characters, and description thereof will not be repeated.

First Embodiment

Figure 1:
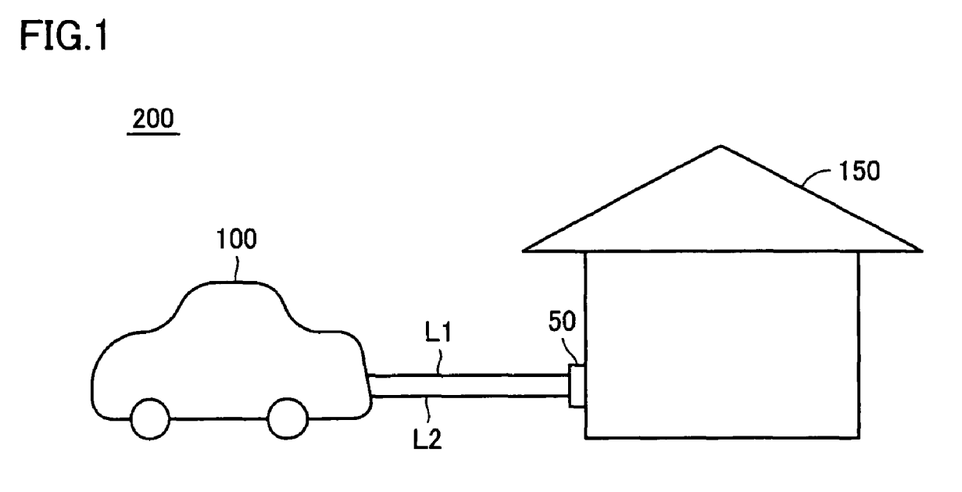
FIG. 1 is a schematic diagram of an electric power system using a hybrid vehicle according to a first embodiment of the present invention.

FIG. 1 is a schematic diagram of an electric power system using a hybrid vehicle according to a first embodiment of the present invention. Referring to FIG. 1, the electric power system 200 includes a hybrid vehicle 100 and a house 150. Hybrid vehicle 100 is connected to an electrical outlet of house 150 by a power supply plug 50 through electric power lines L1 and L2.

Hybrid vehicle 100 can receive commercial electric power from house 150 through electric power lines L1 and L2, and charge an electricity storage device which is not shown. Hybrid vehicle 100 can also generate electric power to supply it to house 150 through electric power lines L1 and L2.

Furthermore, hybrid vehicle 100 transmits various pieces of information to and from house 150 through electric power lines L1 and L2. For example, hybrid vehicle 100 can output information, such as the state of charge (SOC) and the temperature of the electricity storage device and the remaining amount of fuel of the engine, to house 150 through electric power lines L1 and L2.

House 150 receives commercial electric power from a commercial power supply which is not shown, and outputs the received commercial electric power to hybrid vehicle 100 through electric power lines L1 and L2. House 150 can receive electric power from hybrid vehicle 100 through electric power lines L1 and L2, and supply it to electrical appliances within the house. For example, house 150 can use hybrid vehicle 100 as power supply equipment in the case of power failure of the commercial power supply.

Furthermore, house 150 receives the above-mentioned various types of information from hybrid vehicle 100 through electric power lines L1 and L2, and displays the information about hybrid vehicle 100 on a display device which is not shown. For example, when hybrid vehicle 100 is used as power supply equipment for house 150, the amount of SOC, the remaining amount of fuel and the like which are received from hybrid vehicle 100 through electric power lines L1 and L2 are displayed on the display device.

Figure 2:
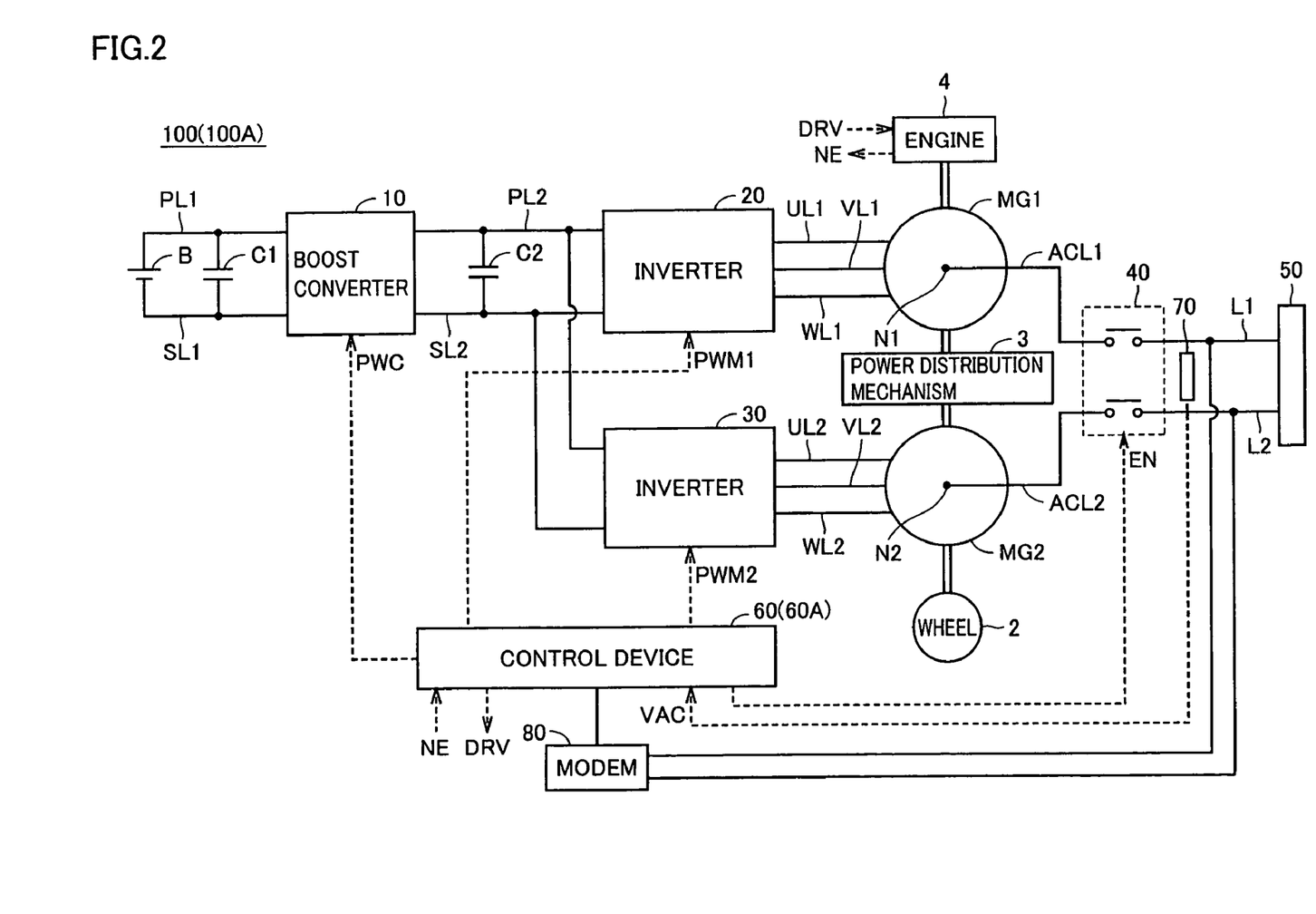
FIG. 2 is an overall block diagram of the hybrid vehicle shown in FIG. 1.

FIG. 2 is an overall block diagram of hybrid vehicle 100 shown in FIG. 1. Referring to FIG. 2, hybrid vehicle 100 includes an engine 4, motor generators MG1 and MG2, a power distribution mechanism 3, and a wheel 2. Hybrid vehicle 100 further includes an electricity storage device B, a boost converter 10, inverters 20 and 30, a relay device 40, a power supply plug 50, a control device 60, a voltage sensor 70, a modem 80, capacitors C1 and C2, power supply lines PL1 and PL2, ground lines SL1 and SL2, U-phase lines UL1 and UL2, V-phase lines VL1 and VL2, W-phase lines WL1 and WL2, and electric power lines ACL1, ACL2, L1 and L2.

Engine 4 operates based on a drive instruction DRV from control device 60. Engine 4 detects engine speed NE by an engine speed sensor which is not shown, and outputs the detected engine speed NE to control device 60.

Power distribution mechanism 3 is linked to engine 4 and motor generators MG1 and MG2, and distributes power among them. For example, a planetary gear mechanism having three rotation shafts including a sun gear, a planetary carrier and a ring gear can be used as power distribution mechanism 3. These three rotation shafts are connected to respective rotation shafts of engine 4 and motor generators MG1 and MG2. For example, the crankshaft of engine 4 is passed through the center of a hollow rotor of motor generator MG1, to thereby allow engine 4 and motor generators MG1 and MG2 to be mechanically connected to power distribution mechanism 3.

The rotation shaft of motor generator MG2 is linked to wheel 2 by a reduction gear or a differential gear which is not shown. A speed reducer for the rotation shaft of motor generator MG2 may further be incorporated into power distribution mechanism 3.

Motor generator MG1 is incorporated into hybrid vehicle 100, as a power generator driven by engine 4 and as an electric motor capable of starting engine 4. Motor generator MG2 is incorporated into hybrid vehicle 100 as an electric motor that drives wheel 2 qualified as a driving wheel.

Electricity storage device B is connected to power supply line PL1 and ground line SL1. Capacitor C1 is connected between power supply line PL1 and ground line SL1. Boost converter 10 is connected between power supply line PL1 and power supply line PL2 and between ground line SL1 and ground line SL2. Capacitor C2 is connected between power supply line PL2 and ground line SL2. Inverters 20 and 30 are each connected in parallel with each other to power supply line PL2 and ground line SL2.

Motor generator MG1 includes a Y-connected three-phase coil (not shown) as a stator coil and is connected to inverter 20 through each of U-phase line UL1, V-phase line VL1 and W-phase line WL1. Motor generator MG2 also includes a Y-connected three-phase coil (not shown) as a stator coil and is connected to inverter 30 through each of U-phase line UL2, V-phase line VL2 and W-phase line WL2. Electric power lines ACL1 and ACL2 each have one end connected to respective neutral points N1 and N2 of the three-phase coils of motor generators MG1 and MG2, and each have the other end connected to relay device 40. Power supply plug 50 is connected to relay device 40 through electric power lines L1 and L2. Modem 80 is connected between control device 60 and electric power lines L1, L2.

Electricity storage device B is a chargeable and dischargeable DC power supply and includes a nickel-hydrogen or lithium-ion secondary battery, for example. Electricity storage device B supplies DC power to boost converter 10. Furthermore, electricity storage device B is charged by boost converter 10. It is to be noted that a large-capacity capacitor may be used as electricity storage device B.

Capacitor C1 smoothes voltage variation between power supply line PL1 and ground line SL1. Based on a signal PWC from control device 60, boost converter 10 boosts the DC voltage received from electricity storage device B, and outputs the boosted voltage to power supply line PL2. Based on signal PWC from control device 60, boost converter 10 lowers the DC voltage received from inverters 20 and 30 through power supply line PL2 to the voltage level of electricity storage device B, and charges electricity storage device B. Boost converter 10 is, for example, comprised of a voltage step-up and step-down chopper circuit and the like.

Capacitor C2 smoothes voltage variation between power supply line PL2 and ground line SL2. Based on a signal PWM1 from control device 60, inverter 20 converts the DC voltage received from power supply line PL2 to a three-phase AC voltage and outputs the converted three-phase AC voltage to motor generator MG1. This causes motor generator MG1 to be driven so as to generate a specified torque. Furthermore, inverter 20 converts the three-phase AC voltage generated by motor generator MG1 receiving the output of engine 4, to a DC voltage based on signal PWM1 from control device 60, and outputs the converted DC voltage to power supply line PL2.

Based on a signal PWM2 from control device 60, inverter 30 converts the DC voltage received from power supply line PL2 to a three-phase AC voltage and outputs the converted three-phase AC voltage to motor generator MG2. This causes motor generator MG2 to be driven so as to generate a specified torque. At the time of regenerative braking of the vehicle, inverter 30 converts the three-phase AC voltage generated by motor generator MG2 receiving rotational force from wheel 2 to a DC voltage based on signal PWM2 from control device 60, and outputs the converted DC voltage to power supply line PL2.

When inverters 20 and 30 supply electric power from hybrid vehicle 100 to house 150, inverters 20 and 30 generate an AC voltage having a commercial power supply frequency across neutral points N1 and N2 based on signals PWM1 and PWM2 from control device 60. Furthermore, when inverters 20 and 30 use the commercial electric power input from power supply plug 50 to charge electricity storage device B, inverters 20 and 30 convert the commercial electric power supplied to neutral points N1 and N2 to a DC power based on signals PWM1 and PWM2 from control device 60, and output the converted DC power to power supply line PL2.

Motor generators MG1 and MG2 are three-phase AC electric motors and include, for example, three-phase AC synchronous electric motors. Motor generator MG1 uses the output of engine 4 to generate a three-phase AC voltage, and outputs the generated three-phase AC voltage to inverter 20. Furthermore, motor generator MG1 generates a driving force by the three-phase AC voltage received from inverter 20, and starts engine 4. Motor generator MG2 generates a vehicle driving torque by the three-phase AC voltage received from inverter 30. At the time of regenerative braking of the vehicle, motor generator MG2 generates a three-phase AC voltage to output the voltage to inverter 30.

Relay device 40 connects/disconnects electric power lines ACL1 and ACL2 to/from electric power lines L1 and L2, respectively, in accordance with a signal EN from control device 60. Specifically, when signal EN is activated, relay device 40 electrically connects electric power lines ACL1 and ACL2 to electric power lines L1 and L2, respectively. When signal EN is deactivated, relay device 40 electrically disconnects electric power lines ACL1 and ACL2 from electric power lines L1 and L2, respectively.

Voltage sensor 70 detects a voltage VAC across electric power lines L1 and L2 and outputs the detected voltage VAC to control device 60. Modem 80 establishes communication with house 150 through electric power lines L1 and L2 and power supply plug 50 based on an instruction from control device 60.

Control device 60 generates signal PWC for driving boost converter 10 and signals PWM1 and PWM2 for driving respective inverters 20 and 30, and outputs the generated signals PWC, PWM1 and PWM2 to boost converter 10, inverters 20 and 30, respectively.

When the electric power is supplied from hybrid vehicle 100 to house 150, control device 60 generates signals PWM1 and PWM2 for controlling inverters 20 and 30, respectively, such that the AC voltage having the commercial power supply frequency is generated across neutral points N1 and N2. Furthermore, when electricity storage device B is charged by the commercial electric power input from power supply plug 50, control device 60 generates signals PWM1, PWM2 and PWC for controlling inverters 20, 30 and boost converter 10, respectively, such that the commercial electric power supplied to neutral points N1 and N2 through electric power lines L1 and L2 and through electric power lines ACL1 and ACL2, respectively, is converted to a DC power to charge electricity storage device B.

Control device 60 establishes communication with house 150 using modem 80 through electric power lines L1 and L2 and power supply plug 50. For example, control device 60 outputs information, such as the SOC and temperature of electricity storage device B and the remaining amount of fuel of engine 4, to modem 80, and instructs modem 80 to output the information to house 150 through electric power lines L1 and L2 and power supply plug 50.

Control device 60 stops or prohibits the electric power generation by motor generator MG1 using the output of engine 4 during the communication with house 150. Specifically, if the electric power generation by motor generator MG1 is performed during the communication with house 150, control device 60 outputs a stop instruction to engine 4 and stops the generation of signal PWM1 for driving motor generator MG1. In addition, if the electric power generation by motor generator MG1 is not performed, control device 60 prohibits the electric power generation by engine 4 and motor generator MG1 during the communication with house 150.

The electric power generation by motor generator MG1 using the output of engine 4 is stopped or prohibited during the communication with house 150. This is because the voltage waveform distortion in electric power lines ACL1, ACL2, L1, and L2 occurs due to the electric power generation by motor generator MG1, and this may cause a communication error in the communication with house 150 through electric power lines L1 and L2. Thus, in the first embodiment, the electric power generation by engine 4 and motor generator MG1 is stopped during the communication with house 150.

When the electric power is transmitted to and from house 150, control device 60 activates signal EN to output it to relay device 40.

Figure 3:
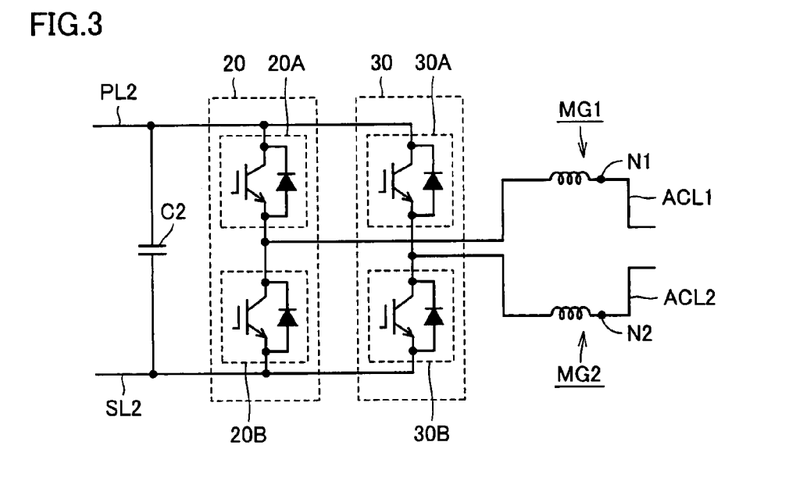
FIG. 3 shows a zero-phase equivalent circuit of an inverter and a motor generator shown in FIG. 2.

FIG. 3 shows a zero-phase equivalent circuit of inverters 20, 30 and motor generators MG1, MG2 shown in FIG. 2. In each of inverters 20 and 30 which are three-phase inverters, there are eight different combination patterns in which six transistors are turned on/off. In each of two of the eight switching patterns, the interphase voltage is zero, and such voltage state is referred to as zero-voltage vector. For the zero-voltage vector, three transistors of each upper arm can be regarded as in the same switching state (all on or all off), and three transistors of each lower arm can also be regarded as in the same switching state. Thus, in FIG. 3, the three transistors of each upper arm of inverter 20 are collectively represented as an upper arm 20A, and the three transistors of each lower arm of inverter 20 are collectively represented as a lower arm 20B. Similarly, the three transistors of each upper arm of inverter 30 are collectively represented as an upper arm 30A, and the three transistors of each lower arm of inverter 30 are collectively represented as a lower arm 30B.

As shown in FIG. 3, this zero-phase equivalent circuit can be regarded as a single-phase PWM inverter which uses the DC voltage supplied from power supply line PL2 to generate a single-phase AC voltage across neutral points N1 and N2. This zero-phase equivalent circuit can also be regarded as a single-phase PWM converter to which the single-phase AC commercial electric power supplied to neutral points N1 and N2 through electric power lines ACL1 and ACL2 is input. Thus, by changing the zero-voltage vector in each of inverters 20 and 30 and performing switching control of inverters 20 and 30 such that inverters 20 and 30 operate as each phase arm of the single-phase PWM inverter or the single phase PWM converter, it becomes possible to convert the DC power from power supply line PL2 to a AC power to output it from power supply plug 50, and also possible to convert the AC commercial electric power input from power supply plug 50 to a DC power to output it to power supply line PL2.

Figure 4:
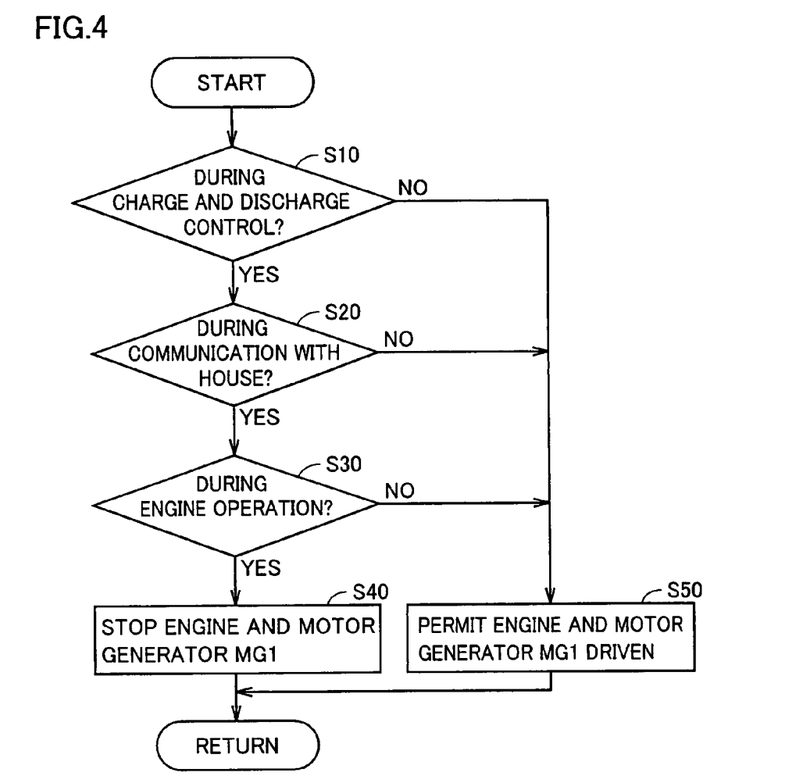
FIG. 4 is a flowchart showing a process as to whether the electric power generation is permitted or not by a control device shown in FIG. 2.

FIG. 4 is a flowchart showing a process as to whether the electric power generation is permitted or not by control device 60 shown in FIG. 2. It is to be noted that the process shown in this flowchart is called from the main routine and executed at regular time intervals or every time the predetermined condition is satisfied.

Referring to FIG. 4, control device 60 determines whether or not the charge and discharge control is being performed in which the electric power is transmitted to and from house 150 (step S10). Specifically, when voltage VAC across electric power lines L1 and L2 is detected by voltage sensor 70 and signal EN output to relay device 40 is activated, control device 60 determines that the charge and discharge control is being performed.

If it is determined in step S10 that the charge and discharge control is being performed (YES in step S10), control device 60 determines whether or not the communication with house 150 using modem 80 through electric power lines L1 and L2 is being performed (step S20). If it is determined in step S20 that the communication with house 150 is being performed (YES in step S20), control device 60 determines based on engine speed NE from engine 4 whether engine 4 is operating or not (step S30).

If it is determined in step S30 that engine 4 is operating (YES in step S30), control device 60 stops engine 4 and motor generator MG1 (step S40). Specifically, control device 60 deactivates drive instruction DRV output to engine 4 (this corresponds to outputting the stop instruction to engine 4) and deactivates signal PWM1 for driving inverter 20 corresponding to motor generator MG1.

On the other hand, if it is determined in step S10 that the charge and discharge control is not being performed (NO in step S10), if it is determined in step S20 that the communication with house 150 is not being performed (NO in step S20), or if it is determined in step S30 that engine 4 is in a stopped state (NO in step S30), control device 60 permits engine 4 and motor generator MG1 to be driven without stopping engine 4 and motor generator MG1 (step S50). More specifically, if the electric power is generated by engine 4 and motor generator MG1, the electric power generation is continued. If engine 4 and motor generator MG1 are in a stopped state, the subsequent operation of generating electric power is permitted.

As described above, according to the first embodiment, since the electric power generation by motor generator MG1 using the output of engine 4 is stopped during the communication between hybrid vehicle 100 and house 150, the voltage distortion in electric power lines L1 and L2 resulting from the electric power generation is suppressed. Consequently, the communication error between hybrid vehicle 100 and house 150 can be prevented.

[Modification of First Embodiment]

Figure 5:
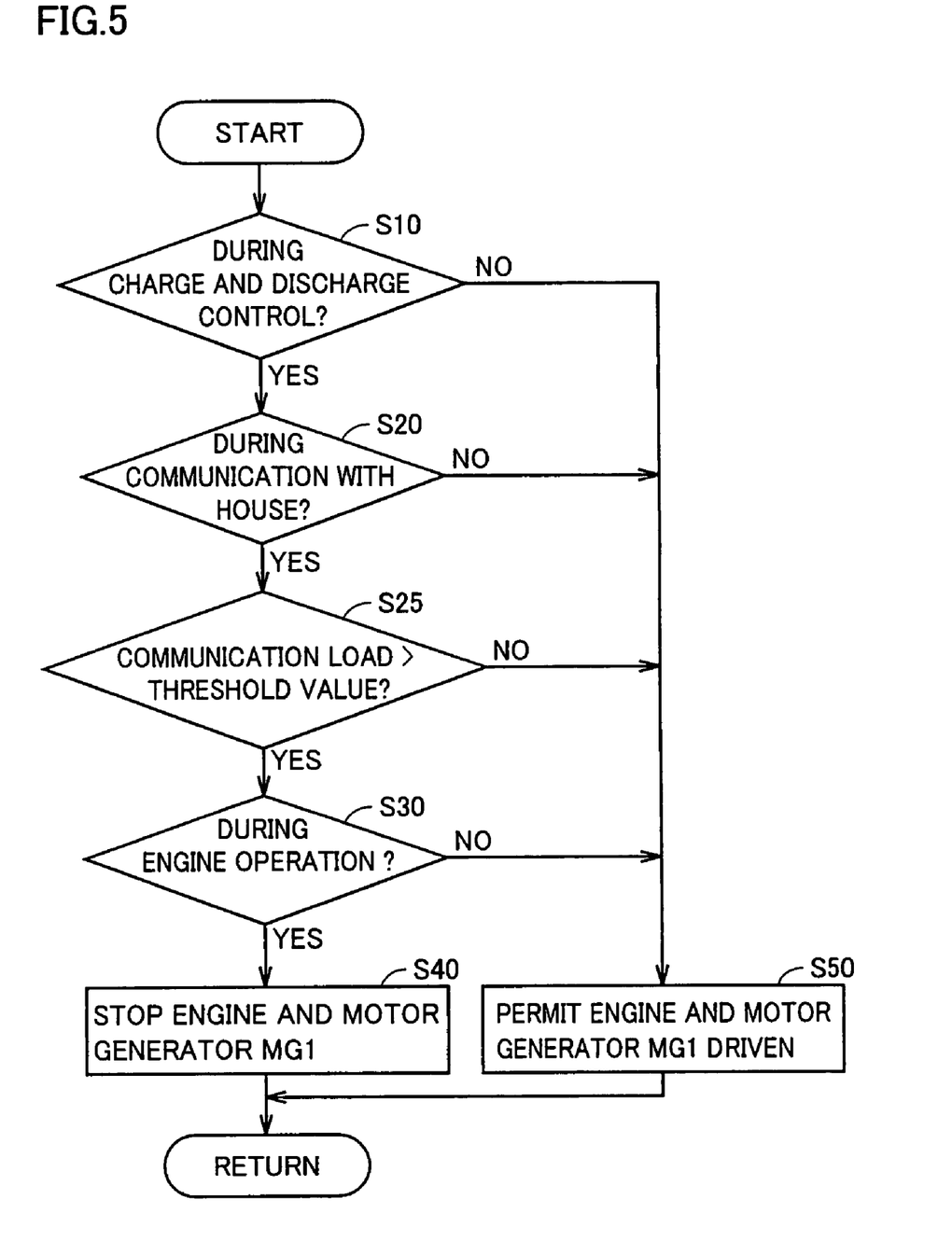
FIG. 5 is a flowchart showing a process as to whether the electric power generation is permitted or not in a modification of the first embodiment.

FIG. 5 is a flowchart showing a process as to whether the electric power generation is permitted or not in a modification of the first embodiment. It is to be noted that the process shown in this flowchart is also called from the main routine and executed at regular time intervals or every time the predetermined condition is satisfied.

Referring to FIG. 5, the process shown in this flowchart further includes step S25 in a series of processes shown in FIG. 4. If it is determined in step S20 that the communication with house 150 is being performed (YES in step S20), control device 60 determines whether or not the current communication load exceeds a preset threshold value indicating that the communication load is high (step S25).

If control device 60 determines that the communication load exceeds the threshold value (YES in step S25), control device 60 proceeds with the process to step S30 and determines whether engine 4 is operating or not. On the other hand, if it is determined in step S25 that the communication load is not more than the threshold value (NO in step S25), control device 60 proceeds with the process to step S50.

In other words, in the modification of the first embodiment, control device 60 stops engine 4 and motor generator MG1 only when the communication load is high, because it is considered that there is a low probability of a communication error if the communication load is low.

As described above, according to the modification of the first embodiment, it becomes possible to minimize the probability of the electric power generation by engine 4 and motor generator MG1 being stopped while preventing the communication error.

Second Embodiment

In the first embodiment and the modification thereof, in the case where the electric power generation by motor generator MG1 using the output of engine 4 coincides with the communication with house 150 using modem 80, the electric power generation is stopped and the communication is performed by priority, whereas in the second embodiment, the communication is interrupted and the electric power generation is performed by priority.

A hybrid vehicle 100A according to the second embodiment includes a control device 60A in place of control device 60 in the configuration of hybrid vehicle 100 according to the first embodiment shown in FIG. 2. Control device 60A interrupts or prohibits the communication with house 150 using modem 80 when the electric power is being generated by motor generator MG1 using the output of engine 4. Specifically, control device 60A outputs an instruction to modem 80 to interrupt or prohibit the data transmission and reception during the operation of engine 4.

It is to be noted that other functions of control device 60A are the same as those of control device 60 in the first embodiment. Furthermore, other configurations in hybrid vehicle 100A are the same as those in hybrid vehicle 100 in the first embodiment.

Figure 6:
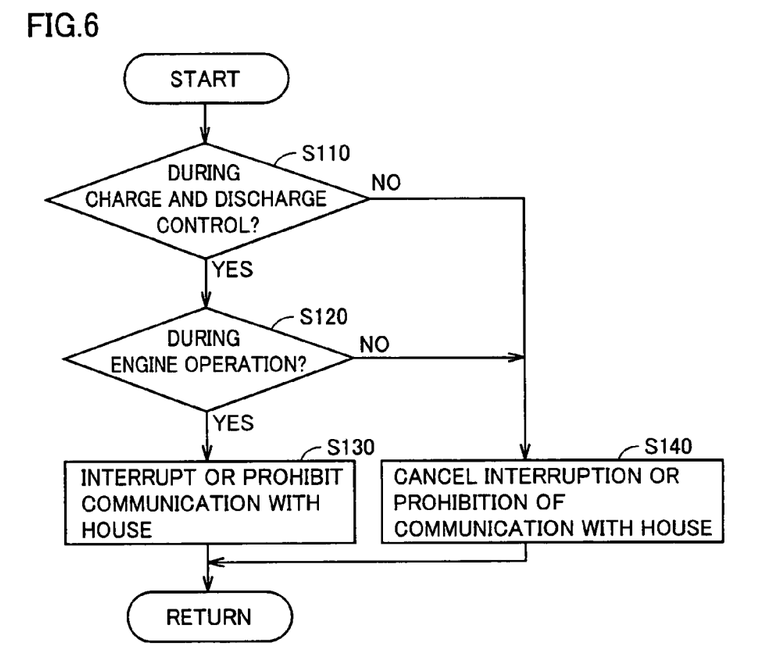
FIG. 6 is a flowchart showing a process as to whether the communication is permitted or not by a control device in a second embodiment.

FIG. 6 is a flowchart showing a process as to whether the communication is permitted or not by control device 60A in the second embodiment. It is to be noted that the process shown in this flowchart is called from the main routine and executed at regular time intervals or every time the predetermined condition is satisfied.

Referring to FIG. 6, control device 60A determines whether or not the charge and discharge control is being performed in which the electric power is transmitted to and from house 150 (step S110). This process is the same as that in step S10 performed by control device 60 in the first embodiment.

If it is determined in step S110 that the charge and discharge control is being performed (YES in step S110), control device 60A determines based on engine speed NE from engine 4 whether engine 4 is operating or not (step S120).

If it is determined in step S120 that engine 4 is operating (YES in step S120), control device 60A interrupts or prohibits the communication with house 150 (step S130). Specifically, if the communication with house 150 is being performed, control device 60A outputs an instruction to modem 80 to interrupt the communication, and if the communication with house 150 is not being performed, control device 60A outputs an instruction to modem 80 to prohibits the subsequent communication.

On the other hand, if it is determined in step S10 that the charge and discharge control is not being performed (NO in step S110) or if it is determined in step S120 that engine 4 is in a stopped state (NO in step S120), control device 60A cancels the interruption or prohibition of the communication with house 150 (step S140). Specifically, if the communication with house 150 is in an interrupted state, the communication is resumed, and if the communication with house 150 is not being performed, the subsequent communication is permitted.

As described above, according to the second embodiment, the communication with house 150 is interrupted or prohibited during the electric power generation by motor generator MG1 using the output of engine 4. Therefore, it becomes possible to prevent the communication error resulting from the communication performed through electric power lines L1 and L2 when voltage distortion in electric power lines L1 and L2 occurs due to the electric power generation.

[Modification of Second Embodiment]

Figure 7:
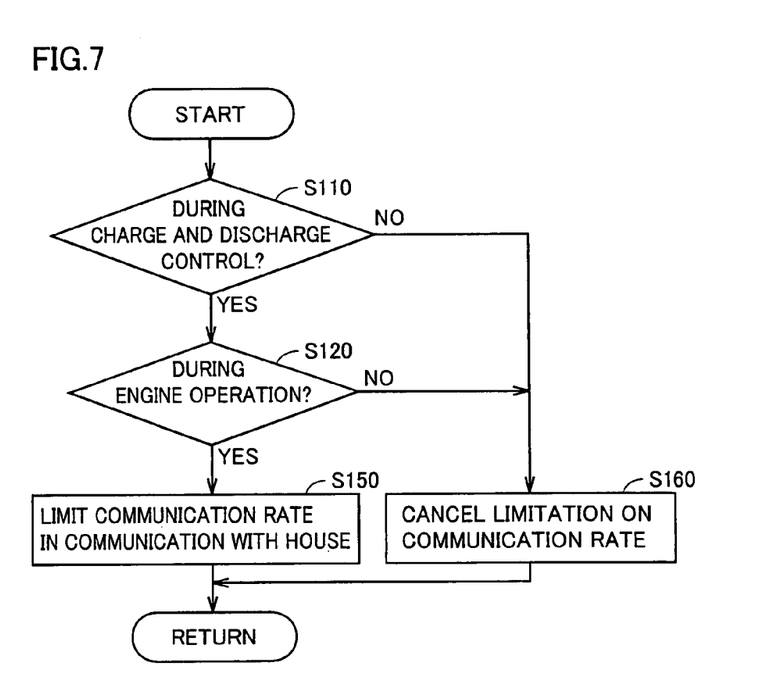
FIG. 7 is a flowchart showing a process as to whether the communication is permitted or not in a modification of the second embodiment.

FIG. 7 is a flowchart showing a process as to whether the communication is permitted or not in a modification of the second embodiment. It is to be noted that the process shown in this flowchart is also called from the main routine and executed at regular time intervals or every time the predetermined condition is satisfied.

Referring to FIG. 7, the process shown in this flowchart includes steps S150 and S160 in place of steps S130 and S140, respectively, in a series of processes shown in FIG. 6. That is, if it is determined in step S120 that engine 4 is operating (YES in step S120), control device 60A limits the communication rate in the communication with house 150 performed through electric power lines L1 and L2 using modem 80 to a predetermined amount (step S150). Specifically, control device 60A sets a communication rate for modem 80 such that the communication with house 150 is performed at the preset communication rate with which the communication error can be minimized.

If it is determined in step S110 that the charge and discharge control is not being performed (NO in step S110) or if it is determined in step S120 that engine 4 is in a stopped state (NO in step S120), control device 60A cancels the limitation in the case where the communication rate with house 150 is limited (step S160).

As described above, according to the modification of the second embodiment, the communication rate is limited during the electric power generation by motor generator MG1 using the output of engine 4. Therefore, it becomes possible to prevent the communication error resulting from the communication performed through electric power lines L1 and L2 when voltage distortion in electric power lines L1 and L2 occurs due to the electric power generation.

In each of the above-described embodiments, hybrid vehicle 100 (100A) is connected to house 150 via power supply plug 50 and transmits electric power and information to and from house 150. Hybrid vehicle 100 (100A) may be, however, connected not only to a house but also to a charging apparatus in the service station, charging equipment connected to the house, and the like.

In the description above, electric power lines ACL1 and ACL2 are connected to neutral points N1 and N2 of motor generators MG1 and MG2, respectively, and electric power is transmitted between electricity storage device B and house 150 through motor generators MG1 and MG2, electric power lines ACL1 and ACL2, and electric power lines L1 and L2, respectively. The system configuration for transmitting the electric power between electricity storage device B and house 150 is, however, not limited to such configuration. For example, the system may be configured to be separately provided with an inverter which is connected to power supply line PL2 and ground line SL2 or to power supply line PL1 and ground line SL1 and which is connected to electric power lines L1 and L2. Also in the case of this system configuration, the voltage waveform distortion in electric power lines L1 and L2 may occur due to the electric power generation by motor generator MG1.

In the description above, motor generator MG1 corresponds to an "electric motor" in the present invention, and house 150 corresponds to an "apparatus external to the vehicle" in the present invention. Furthermore, electric power lines ACL1, ACL2 and L1, L2 form an "electric power line" in the present invention, and modem 80 corresponds to a "communication device" in the present invention. Control device 60 corresponds to a "control unit" in the present invention.

In addition, engine 4 corresponds to an "internal combustion engine" in the present invention, and motor generators MG1 and MG2 correspond to a "first electric motor" and a "second electric motor", respectively, in the present invention.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

The invention claimed is:

1. An electrical system installed in a vehicle comprising:
an electric motor generating electric power, operating based on a given instruction;
an electricity storage device transmitting electric power to and from said electric motor;
an electric power line configured to be capable of transmitting the electric power between said electricity storage device and an apparatus external to the vehicle;
a communication device configured to perform communication with said apparatus through said electric power line; and
a control unit outputting, to said electric motor and an internal combustion engine instructions to stop said electric motor and said internal combustion engine, when the communication with said apparatus is being performed by said communication device.

2. The electrical system according to claim 1, wherein said control unit outputs said instructions to said electric motor and said internal combustion engine when the communication with said apparatus is being performed by said communication device and a communication load with said apparatus by said communication device exceeds a predetermined amount.

3. The electrical system according to claim 2, wherein said electric motor includes a star-connected polyphase winding as a stator winding,
said electric power line is connected to a neutral point of said polyphase winding, and
the electric power is transmitted between said electricity storage device and said apparatus external to the vehicle through said electric motor and said electric power line.

4. The electrical system according to claim 1, wherein said electric motor includes a star-connected polyphase winding as a stator winding,
said electric power line is connected to a neutral point of said polyphase winding, and
the electric power is transmitted between said electricity storage device and said apparatus external to the vehicle through said electric motor and said electric power line.

5. An electrical system installed in a vehicle comprising:
an electric motor operating based on a given instruction;
an electricity storage device transmitting electric power to and from said electric motor;
an electric power line configured to be capable of transmitting the electric power between said electricity storage device and an apparatus external to the vehicle;
a communication device configured to perform communication with said apparatus through said electric power line; and
a control unit outputting, to said communication device, an instruction to prohibit the communication with said apparatus or to limit an amount of communication with said apparatus while outputting, to said electric motor, an instruction to drive said electric motor.

6. The electrical system according to claim 5, wherein said electric motor includes a star-connected polyphase winding as a stator winding, said electric power line is connected to a neutral point of said polyphase winding, and the electric power is transmitted between said electricity storage device and said apparatus external to the vehicle through said electric motor and said electric power line.

7. A hybrid vehicle comprising:

an internal combustion engine;

a first electric motor mechanically linked to said internal combustion engine and generating electric power using an output of said internal combustion engine;

an electricity storage device charged with the electric power generated by said first electric motor;

a second electric motor mechanically linked to a drive shaft of the vehicle and generating a driving force of the vehicle using the electric power from said electricity storage device;

an electric power line configured to be capable of transmitting the electric power between said electricity storage device and an apparatus external to the vehicle;

a communication device configured to perform communication with said apparatus through said electric power line; and a control unit outputting, to said internal combustion engine and to said first electric motor, instructions to prohibit an operation of said internal combustion engine and said first electric motor, when the communication with said apparatus is being performed by said communication device.

8. The hybrid vehicle according to claim 7, wherein said control unit outputs said instructions to said internal combustion engine and said first electric motor when the communication with said apparatus is being performed by said communication device and a communication load with said apparatus by said communication device exceeds a predetermined amount.

9. The hybrid vehicle according to claim 8, wherein said first and second electric motors each include a star-connected polyphase winding as a stator winding, said electric power line is connected to a neutral point of each polyphase winding of said first and second electric motors, and the electric power is transmitted between said electricity storage device and said apparatus external to the vehicle through said first and second electric motors and each said electric power line corresponding thereto.

10. The hybrid vehicle according to claim 7, wherein said first and second electric motors each include a star-connected polyphase winding as a stator winding, said electric power line is connected to a neutral point of each polyphase winding of said first and second electric motors, and the electric power is transmitted between said electricity storage device and said apparatus external to the vehicle through said first and second electric motors and each said electric power line corresponding thereto.

11. A hybrid vehicle comprising:

an internal combustion engine;

a first electric motor mechanically linked to said internal combustion engine and generating electric power using an output of said internal combustion engine;

an electricity storage device charged with the electric power generated by said first electric motor;

a second electric motor mechanically linked to a drive shaft of the vehicle and generating a driving force of the vehicle using the electric power from said electricity storage device;

an electric power line configured to be capable of transmitting the electric power between said electricity storage device and an apparatus external to the vehicle;

a communication device configured to perform communication with said apparatus through said electric power line; and a control unit outputting, to said communication device, an instruction to prohibit the communication with said apparatus or to limit an amount of communication with said apparatus when said internal combustion engine is operating.

12. The hybrid vehicle according to claim 11, wherein said first and second electric motors each include a star-connected polyphase winding as a stator winding, said electric power line is connected to a neutral point of each polyphase winding of said first and second electric motors, and the electric power is transmitted between said electricity storage device and said apparatus external to the vehicle through said first and second electric motors and each said electric power line corresponding thereto.

13. A method of controlling a hybrid vehicle, said hybrid vehicle including an internal combustion engine, a first electric motor mechanically linked to said internal combustion engine and generating electric power using an output of said internal combustion engine, an electricity storage device charged with the electric power generated by said first electric motor, a second electric motor mechanically linked to a drive shaft of the vehicle and generating a driving force of the vehicle using the electric power from said electricity storage device, an electric power line configured to be capable of transmitting the electric power between said electricity storage device and an apparatus external to the vehicle, and a communication device configured to perform communication with said apparatus through said electric power line, said control method comprising:

a first step of determining whether or not the communication with said apparatus is being performed by said communication device, and a second step of prohibiting an operation of said internal combustion engine and said first electric motor when it is determined that the communication with said apparatus is being performed.

14. The control method according to claim 13, further comprising a third step of determining whether or not communication load with said apparatus by said communication device exceeds a predetermined amount, wherein the operation of said internal combustion engine and said first electric motor is prohibited in said second step only when it is determined that said communication load exceeds the predetermined amount.

15. A method of controlling a hybrid vehicle, said hybrid vehicle including an internal combustion engine, a first electric motor mechanically linked to said internal combustion engine and generating electric power using an output of said internal combustion engine, an electricity storage device charged with the electric power generated by said first electric motor, a second electric motor mechanically linked to a drive shaft of the vehicle and generating a driving force of the vehicle using the electric power from said electricity storage device, an electric power line configured to be capable of transmitting the electric power between said electricity storage device and an apparatus external to the vehicle, and a communication device configured to perform communication with said apparatus through said electric power line, said control method comprising:

a first step of determining whether or not said internal combustion engine is operating, and a second step of prohibiting the communication with said apparatus or limiting an amount of communication with said apparatus when it is determined that said internal combustion engine is operating.

* * * * *